United States Patent
Nakagawa et al.

(10) Patent No.: US 9,233,616 B2
(45) Date of Patent: Jan. 12, 2016

(54) CHARGING SYSTEM FOR MINIMIZING SYSTEM ENERGY

(71) Applicant: HONDA MOTOR CO., LTD., Tokyo (JP)

(72) Inventors: Tomoaki Nakagawa, Sakura (JP); Takayuki Kato, Saitama (JP); Junya Noguchi, Utsunomiya (JP); Shinji Takuno, Utsunomiya (JP); Yusaku Amari, Saitama (JP); Atsushi Hirosawa, Utsunomiya (JP); Hiroyuki Abe, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 13/962,573

(22) Filed: Aug. 8, 2013

(65) Prior Publication Data

US 2014/0049217 A1 Feb. 20, 2014

(30) Foreign Application Priority Data

Aug. 15, 2012 (JP) ................. 2012-179985

(51) Int. Cl.
*H02J 7/00* (2006.01)
*B60L 11/18* (2006.01)

(52) U.S. Cl.
CPC ......... *B60L 11/1809* (2013.01); *B60L 11/184* (2013.01); *B60L 11/1838* (2013.01); *B60L 11/1844* (2013.01); *B60L 2230/22* (2013.01); *B60L 2230/24* (2013.01); *Y02E 60/721* (2013.01); *Y02T 10/7005* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC ............ B60L 11/1809; B60L 11/1838; B60L 11/184; B60L 11/1844; B60L 2230/22; B60L 2230/24; Y02E 60/721; Y02T 10/7005; Y02T 10/7094; Y02T 90/121; Y02T 90/128; Y02T 90/14; Y02T 90/163; Y02T 90/169; Y04S 10/126; Y04S 30/14
See application file for complete search history.

(56) References Cited

U.S. PATENT DOCUMENTS

| | | | |
|---|---|---|---|
| 2011/0133688 A1 | 6/2011 | Ishibashi | |
| 2011/0202221 A1* | 8/2011 | Sobue et al. | ............... 701/22 |
| 2012/0249065 A1* | 10/2012 | Bissonette et al. | ........... 320/109 |
| 2013/0096725 A1* | 4/2013 | Ishida et al. | ............... 700/286 |

FOREIGN PATENT DOCUMENTS

| | | | |
|---|---|---|---|
| JP | 2011-125122 A | | 6/2011 |
| WO | WO2012/002001 | * | 2/2012 |

* cited by examiner

*Primary Examiner* — Nha Nguyen
(74) *Attorney, Agent, or Firm* — Westerman, Hattori, Daniels & Adrian, LLP

(57) ABSTRACT

A vehicle-mounted electric storage device of an electrically driven vehicle is charged with a necessary amount of energy, which corresponds to an amount of energy consumption in a next-time running of the electrically driven vehicle, such that a shortage of renewable energy at a charging site is compensated for by charging the electrically driven vehicle with system energy.

4 Claims, 16 Drawing Sheets

CHARGING SYSTEM FOR MINIMIZING SYSTEM ENERGY

CROSS-REFERENCE TO RELATED APPLICATION

This application is based upon and claims the benefit of priority from Japanese Patent Application No 2012-179085 filed on Aug. 15, 2012, the contents of which are incorporated herein by reference.

BACKGROUND OF THE INVENTION

1. Field of the Invention

The present invention relates to a charging system for minimizing system energy or commercial energy applicable to an electrically driven vehicle having a vehicle-mounted electric storage device, which can be charged from an external electric charger. The electrically driven vehicle includes an electric vehicle (EV), a plug-in hybrid vehicle (PHEV), a plug-in fuel cell vehicle (PFCV), or the like.

In the following description, the term "energy" refers to electric power [W], and the term "amount of energy" refers to an amount of electric power [Wh].

2. Description of the Related Art

Heretofore, there has been proposed a battery charging system, which stores renewable energy such as wind power or solar power, together with system energy (commercial energy) supplied from an electric power company or the like, in a stationary electric storage device that is placed at a residential building or the like. In such a system, an electric vehicle battery is charged at a charging site, e.g., such as a residential building, which is equipped with the stationary electric storage device. For details, reference should be made to Japanese Laid-Open Patent Publication No. 2011-125122.

In the battery control system disclosed in Japanese Laid-Open Patent Publication No. 2011-125122, the total amount of electric power consumption in the residential building is estimated to include an amount of electric power consumption (energy consumption) of the electric vehicle. If the amount of electric power, which is obtained by adding the storage amount of the stationary electric storage device and the amount of solar power generated by a solar panel, it lower than the estimated amount of electric power consumption, the amount of electric power (system energy) to be stored in the stationary electric storage device is purchased from an electric power company, or is generated by a generator using natural gas or hydrogen, so that a necessary amount of electric power is stored constantly in the stationary electric storage device. Japanese Laid-Open Patent Publication No. 2011-125122 describes that it is possible for the system to efficiently control the stationary electric storage device that is introduced into the residential building or the like (see paragraphs [0036], [0047], and [0052] of Japanese Laid-Open Patent Publication No. 2011-125122).

SUMMARY OF THE INVENTION

Recently, much attention has been drawn to the impact of vehicles on the environment, as evidenced by regulations introduced at the national level concerning $CO_2$ emissions [kg/km] from running vehicles.

Therefore, as much as possible, users of electrically driven vehicles prefer for such vehicles to be run by renewable energy.

According to the above-mentioned related art, however, the object of the related art is to optimize the total amount of electric power consumption in the residential building including the electric vehicle, and the type of energy (renewable energy or system energy) consumed by the electrically driven vehicle is not considered.

The present invention has been devised taking into consideration the aforementioned problems. It is an object of the present invention to provide a charging system for minimizing system energy, which is capable of allowing an electrically driven vehicle to be driven by consumption of renewable, energy insofar as possible, thereby enabling the electrically driven vehicle, to consume a minimal amount of system energy.

According to the present invention, there is provided a charging system for minimizing system energy comprising an electrically driven vehicle including a vehicle-mounted electric storage device, which is charged with and retains renewable energy and system energy, and a vehicle-mounted charging controller for controlling charging of the vehicle-mounted electric storage device, and a charging site including a generating device for generating the renewable energy, a charging site electric storage device for storing the renewable energy and the system energy, and a charging-site charging controller for controlling storage of energy in the charging-site electric storage device, and also controlling a type of energy used for charging the vehicle-mounted electric storage device of the electrically driven vehicle from the charging site, wherein the vehicle-mounted charging controller and the charging-site charging controller cooperate to charge the vehicle-mounted electric storage device of the electrically driven vehicle with a necessary amount of energy, which corresponds to an amount of energy consumption in a next-time running of the electrically driven vehicle, such that a shortage of the renewable energy is compensated for by charging with the system energy.

According to the present invention, when the vehicle-mounted electric storage device is charged with a necessary amount of energy, which corresponds to an amount of energy consumption in a next-time running of an electrically driven vehicle from the charging site, a shortage of renewable energy at the charging site is compensated for by charging with system energy. Thus, it is possible to minimize the amount of system energy used for charging the vehicle-mounted electric storage device.

More specifically, in this structure, the vehicle-mounted charging controller and the charging-site charging controller calculate a necessary amount Ex of the system energy used for charging the vehicle-mounted electric storage device of the electrically driven vehicle up to a present charging end time, using the equation Ex=Ea−(Eb+Ec+Ed), wherein Ea is the amount of energy consumption in the next-time running, Eb is an amount of energy generated by the generating device from a last charging end time to the present charging end time, Ec is a remaining amount of energy in the vehicle-mounted electric storage device of the electrically driven vehicle at a present charging start time, and Ed is a remaining amount of energy in the charging site electric storage device at the charging site at the present charging start time, thereby minimizing the necessary amount Ex of the system energy.

Further, the vehicle-mounted charging controller and the charging-site charging controller memorize an electricity rate of the system energy in respective time zones, such that when the vehicle-mounted electric storage device of the electrically driven vehicle is charged from the charging site, the vehicle-mounted electric storage device is charged with the system energy in real time during a time zone in which the electricity rate is the lowest. Thus, the cost of system energy required for charging the vehicle-mounted electric storage device can be reduced.

Further, when the vehicle-mounted electric storage device of the electrically driven vehicle is charged from the charging site, the vehicle-mounted charging controller and the charging-site charging controller charge the vehicle-mounted electric storage device with the renewable energy, which is generated in real time by the generating device, if the generating device is generating the renewable energy. Thus, the amount of renewable energy RE used for charging the vehicle-mounted electric storage device can be maximized.

Further, the vehicle-mounted charging controller and the charging-site charging controller can estimate the amount of energy consumption in the next-time running, based on a past energy consumption history during running of the electrically driven vehicle.

The present invention can be realized in various configurations. For example, a method of minimizing system energy in a charging system may be provided for charging an electrically driven vehicle from a charging site, the charging system comprising the electrically driven vehicle including a vehicle-mounted electric storage device, which is charged with and retains renewable energy and system energy, and a charging site including a generating device for generating the renewable energy and a charging-site storage device for storing the renewable energy and the system energy, the method comprising a next-time, running energy consumption estimating step of estimating an amount of energy consumption in a next-time running of the electrically driven vehicle, and a charge-controlling step of controlling a type of energy used for charging the vehicle-mounted electric storage device of the electrically driven vehicle from the charging site, wherein in the charge-controlling step, when energy that corresponds to the amount of energy consumption in the next-time running is stored in the charging-site storage device at the charging site, a shortage of the stored renewable energy is compensated for by storing the system energy, so as to minimize a charged amount of the system energy.

According to the present invention, when the vehicle-mounted electric storage device of the electrically driven vehicle is charged at the charging site, the charged amount of system energy is controlled to a minimum. Accordingly, the electrically driven vehicle can be run using a maximum amount of renewable energy, and therefore, a minimal amount of system energy.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A charging system for minimizing system energy (commercial energy) according to preferred embodiments of the present invention will be described below with reference to the drawings.

Figure 1:
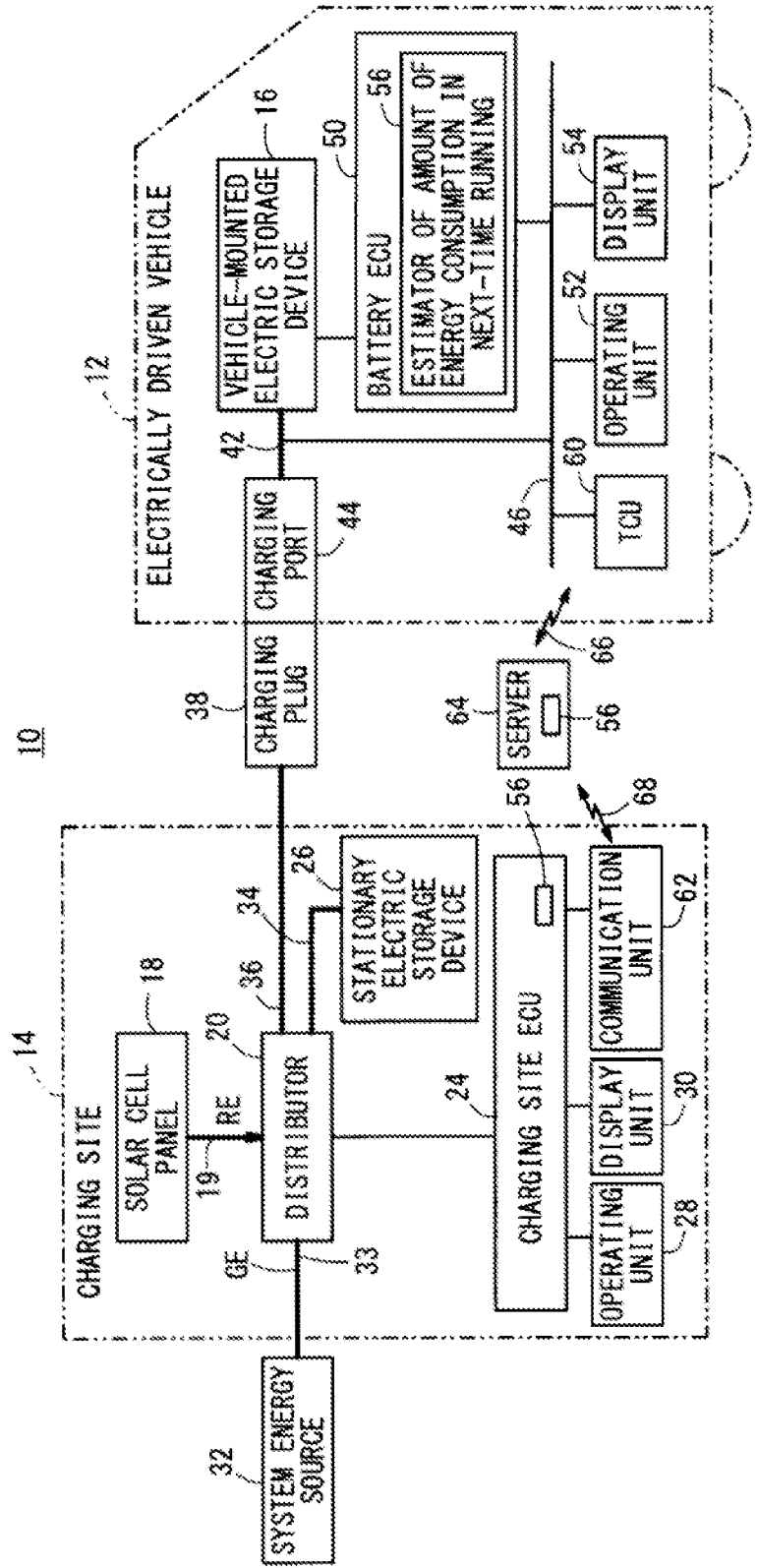
FIG. 1 is a schematic block diagram of a charging system for minimizing system energy according to an embodiment of the present invention.

FIG. 1 shows in schematic block form a charging system 10 for minimizing system energy according to an embodiment of the present invention.

The charging system 10 for minimizing system energy basically comprises an electrically driven vehicle 12 (hereinafter also referred to simply as a "vehicle 12") of the user, and a charging site 14 such as a residence of the user.

The electrically driven vehicle 12 according to the present embodiment comprises an electric vehicle (EV), which uses electric energy as an energy source and an electric motor as a power source. However, the electrically driven vehicle 12 is not limited to an electric vehicle, but may be a vehicle having a vehicle-mounted electric storage device 16 such as a battery (secondary cells) that can be charged by an external electric charger including the charging site 14 or the like, such as a plug-in hybrid vehicle (PHEV), a plug-in fuel cell vehicle (PFCV), or the like.

According to the present embodiment, the vehicle-mounted electric storage device 16 comprises a battery. However, the vehicle-mounted electric storage device 16 may alternatively comprise a capacitor that can be charged and discharged.

The charging site 14 includes a solar cell panel 18, which serves as an electric generator for generating renewable energy (hereinafter also referred to as "renewable energy RE" or simply "RE"), and a distributor 20 for distributing renewable energy RE supplied from the solar cell panel 18 through a cable 19. The renewable energy RE may be energy generated by solar power generation, or energy with low $CO_2$ emission typified by wind power generation, geothermal power generation, etc.

The charging site 14 also includes a charging site ECU 24, which serves as a charging-site charging controller and is connected to the distributor 20. The charging site ECU 24 is connected to an operating unit 28, a display unit 30, and a communication unit 62.

The distributor 20 of the charging site 14 is supplied with system energy (or commercial energy, hereinafter also referred to as "system energy GE" or simply "GE") from a system energy source 32 such as an electric power company or the like through a cable 33.

The distributor 20 is connected to a stationary electric storage device 26 through a cable 34, and to a charging plug 38 through a cable 36.

Each of the cables 19, 33, 34, 36 comprises power lines for sending and receiving energy, and control lines for sending and receiving data.

In the electrically driven vehicle 12, e.g., at a time of charging the vehicle-mounted electric storage device 16 with electricity, the vehicle-mounted electric storage device 16 is connected through a cable 42 to a charging port 44 having a lid. The charging plug 38, which is connected to the cable 36 of the charging site 14, is detachably connected to the charging port 44 of the electrically driven vehicle 12.

The electrically driven vehicle 12 has a communication line 46 such as a CAN (Controller Area Network) or the like. A battery ECU 50, which serves as a vehicle-mounted charging controller, is connected through the communication line 46 to an operating unit 52 and a display unit 54. The vehicle-mounted electric storage device 16 also is connected to the battery ECU 50 through the control line.

The operating unit 52 and the display unit 54 may be provided as dedicated units. However, the operating unit 52 and the display unit 54 may be replaced with a vehicle-mounted navigation device, which has an operating unit and a display unit, or a touch-panel multi-information display device.

Each of the charging site ECU 24 and the battery ECU 50 comprises a computer including a microcomputer, and has a CPU (central processing unit), a memory including a ROM (read only memory) (including an EEPROM) and a RAM (random access memory), input/output devices such as an A/D converter and a D/A converter, and a timer that serves as a time measuring unit. The CPU reads and executes programs stored in the ROM to act as various function realizing sections (function realizing means), e.g., a controller, an arithmetic unit, and a processor.

As described below, in order to minimize the charged amount of system energy GE in the vehicle-mounted electric storage device 16, it is necessary, in certain cases, to estimate an amount of electric energy generated by the solar cell panel 18 during a charging time period, a remaining amount of energy stored in the vehicle-mounted electric storage device 16 at the charging start time, or the like, up to the charging start time of the vehicle-mounted electric storage device 16 at the charging site 14. Thus, the battery ECU 50 and the charging site ECU 24 cooperate together in order to estimate these amounts.

For carrying out such an estimation, the battery ECU 50 is connected to a TCU (telematics control unit) 60 (communication controller, telematics device) through the communication line 46, and the charging site ECU 24 is connected to the communication unit 62.

The battery ECU 50 and the charging site ECU 24 communicate with each other through a communication link 66, a server 64, and a communication link 68 for sending and receiving various types of information. The server 64 also performs an authentication process for facilitating mutual communications between the battery ECU 50 and the charging site ECU 24.

Data may be shared synchronously and mutually between the charging site ECU 24 of the charging site 14, the server 64, and the TCU 60 of the electrically driven vehicle. 12 via the communication link 68, e.g., a public communication network, and the communication link 66, e.g., a mobile communication network.

The charging site 14 and the electrically driven vehicle 12 may communicate with each other directly instead of via the server 64. Either the charging site 14 or the electrically driven vehicle 12 may function as a server.

In the present embodiment, one or all of the battery ECU 50, the charging site ECU 24, and the server 64 may function as an estimator 56 that estimates an amount of energy consumption in a next-time running of the vehicle 12 or the like.

Operation of the charging system 10 for minimizing system energy, which is configured basically as described above, will be described below in the following sequence for facilitating understanding of the present invention.

I. Outline of Entire Operation
II. Calculation Process of Conditions and Parameters for Minimizing System Energy during Charging
III. Storing Process in Stationary Electric Storage Device 26 and Charging Process in Vehicle-Mounted Electric Storage Device 16 for Minimizing System Energy during Charging
IV. Charging Method of Vehicle-Mounted Electric Storage Device 16 in Different Charging Time Periods
V. Timings for Performing Process of Minimizing System Energy during Charging
VI. Entire Operation Based on Flowcharts

[I. Outline of Entire Operation]

Figure 2:
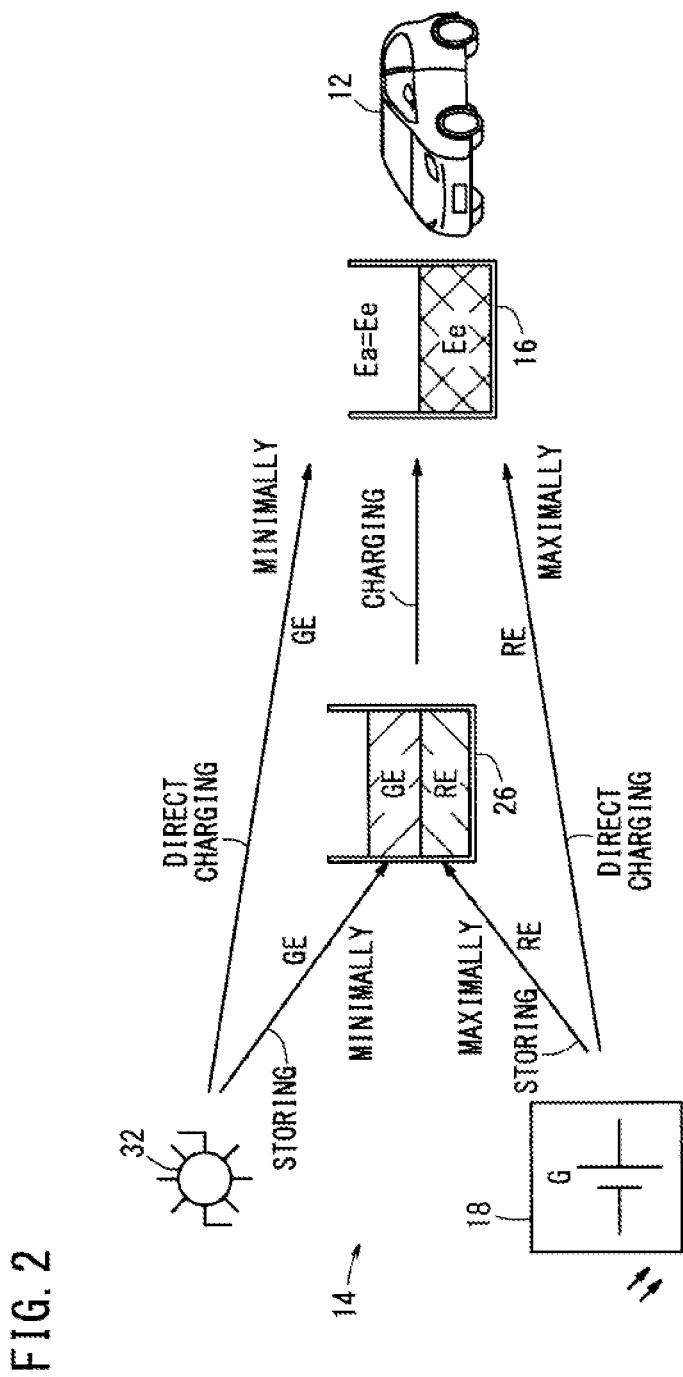
FIG. 2 is a diagram illustrative of principles of the charging system for minimizing system energy according to the embodiment.

FIG. 2 is a diagram illustrative of the principles of the charging system 10 for minimizing system energy.

In order to promote running of the vehicle 12 using renewable energy RE, the vehicle-mounted electric storage device 16 of the vehicle 12 is charged maximally with renewable energy RE.

However, power generation of renewable energy RE by means of the solar cell panel 18 or the like is susceptible to variations in the natural environment, and it is impossible to generate electricity constantly. For this reason, the stationary electric storage device 26 is utilized.

Further, since cases occur in which renewable energy RE cannot cover all of the energy required for running the vehicle 12, the vehicle-mounted electric storage device 16 may occasionally be charged with system energy GE, which inevitably is supplied from the system energy source 32.

In such cases, the charged amount of system energy GE used to charge the vehicle-mounted electric storage device 16 is controlled (restricted) to a minimum.

For this purpose, as shown in FIG. 2, an amount of energy consumption Ea in a next-time running of the vehicle 12 is estimated, and the estimated energy consumption Ea is set as a necessary amount Ee of energy for the vehicle-mounted electric storage device 16 (Ee=Ea). When the charging port 44 of the vehicle 12 is connected to the charging plug 38 of the charging site 14, and while the solar well panel 18 is generating energy, the vehicle-mounted electric storage device 16 is charged directly and maximally in real time with the generated energy (first priority charging mode). The amount of energy consumption Ea in the next-time running of the vehicle 12 may include an additional amount (+α) of energy.

If, prior to the departure time of the vehicle 12, direct charging with renewable energy RE is insufficient to reach the necessary amount Ee, then the vehicle-mounted electric storage device 16 is charged with the renewable energy RE that is stored in the stationary electric storage device 26 (second priority charging mode). If charging is still insufficient to reach the necessary amount Ee, and if charging takes place during a time zone such as midnight when the electricity rate is low, charging is performed with energy supplied directly from the system energy source 32 (third priority charging mode). If charging does not take place during a time zone when the electricity rate is low, charging is performed with system energy GE from the stationary electric storage device 26 (fourth priority charging mode). If the amount of charging is still insufficient, charging is performed with system energy GE from the system energy source 32 during a time zone in which the electricity rate is high fifth priority charging mode).

If cost is of greater priority, the priority order of the third priority charging mode (direct charging with system energy GE from the system energy source 32) may be reversed with the fourth priority charging mode (charging with system energy GE from the stationary electric storage device 26). This is because the electricity rate of system energy GE stored in the stationary electric storage device 26 has already been paid for.

Alternatively, if efficiency in charging and discharging is of greater priority, the third priority charging mode (direct charging with system energy GE from the system energy source 32) is prioritized over the fourth priority charging mode (charging with system energy GE from the stationary electric storage device 26), taking into consideration losses in conversion of the system energy GE of DC power stored in the stationary electric storage device 26 into AC power used for charging the vehicle 12.

The charging site ECU 24 manages the amount and type of energy (system energy GE or renewable energy RE) stored in the stationary electric storage device 26. In order to give higher priority to renewable energy RE stored in the stationary electric storage device 26, it is preferable for the system energy GE stored in the stationary electric storage device 26 to be consumed first, in the case that electrical appliances are used in the user's house or the like where the charging site 14 is installed.

As mentioned above, it should be noted that losses that occur in direct charging and discharging are practically lower than losses that occur in indirect charging and discharging through the stationary electric storage device 26.

Figure 3:
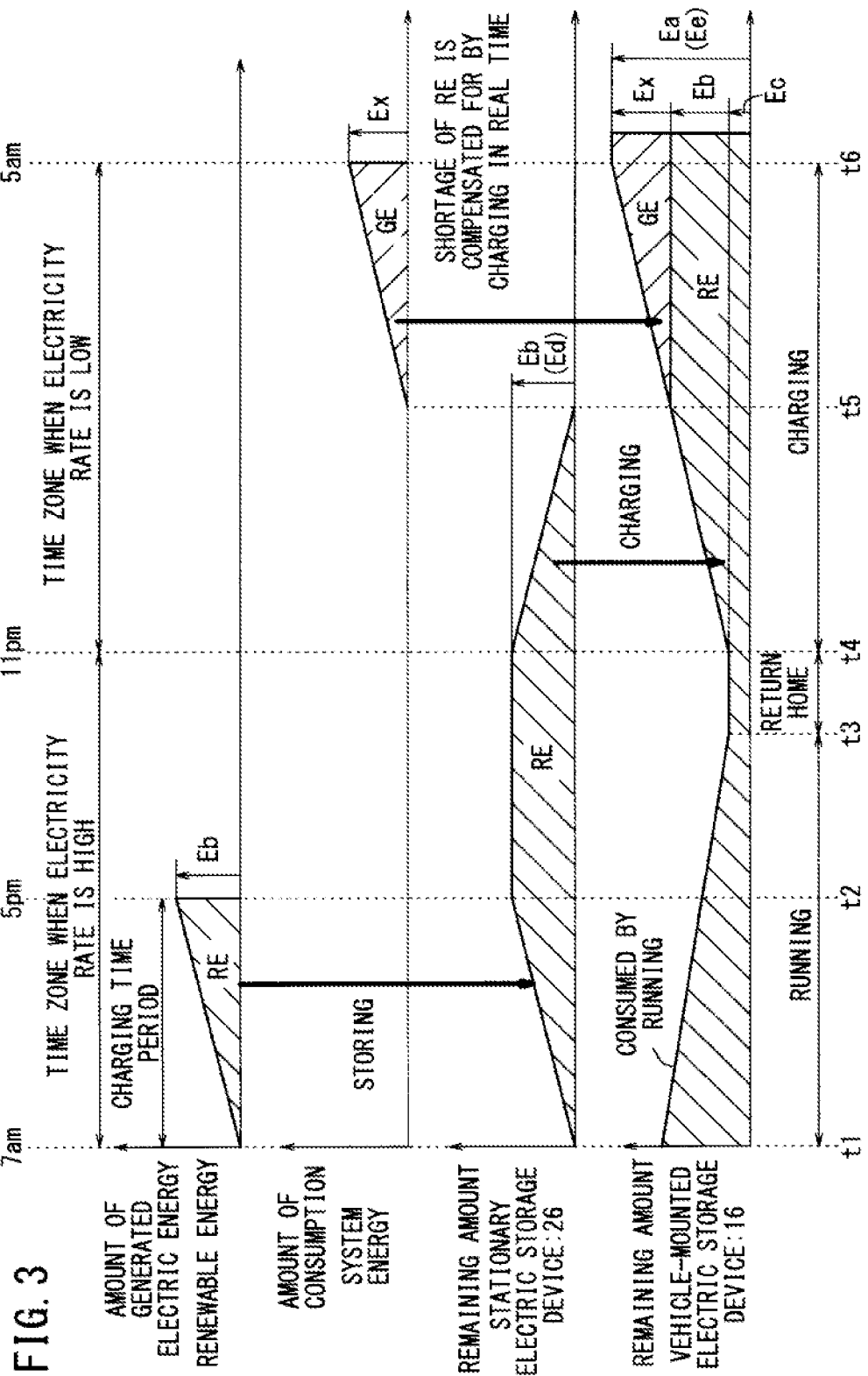
FIG. 3 is a timing chart illustrative of a case in which an electrically driven vehicle runs primarily during the daytime, and a vehicle-mounted electric storage device is charged during the nighttime with a necessary amount of energy corresponding to an amount of energy consumption used in a next-time running of the vehicle.

FIG. 3 is a timing chart illustrative of a case in which the vehicle 12 runs mainly during the daytime, and the vehicle-mounted electric storage device 16 of the vehicle 12 is charged during the night with the necessary amount Ee of energy corresponding to an amount of energy consumption Ea in a next-time running of the vehicle 12, by connecting the charging plug 38 to the charging port 44.

Figure 4:
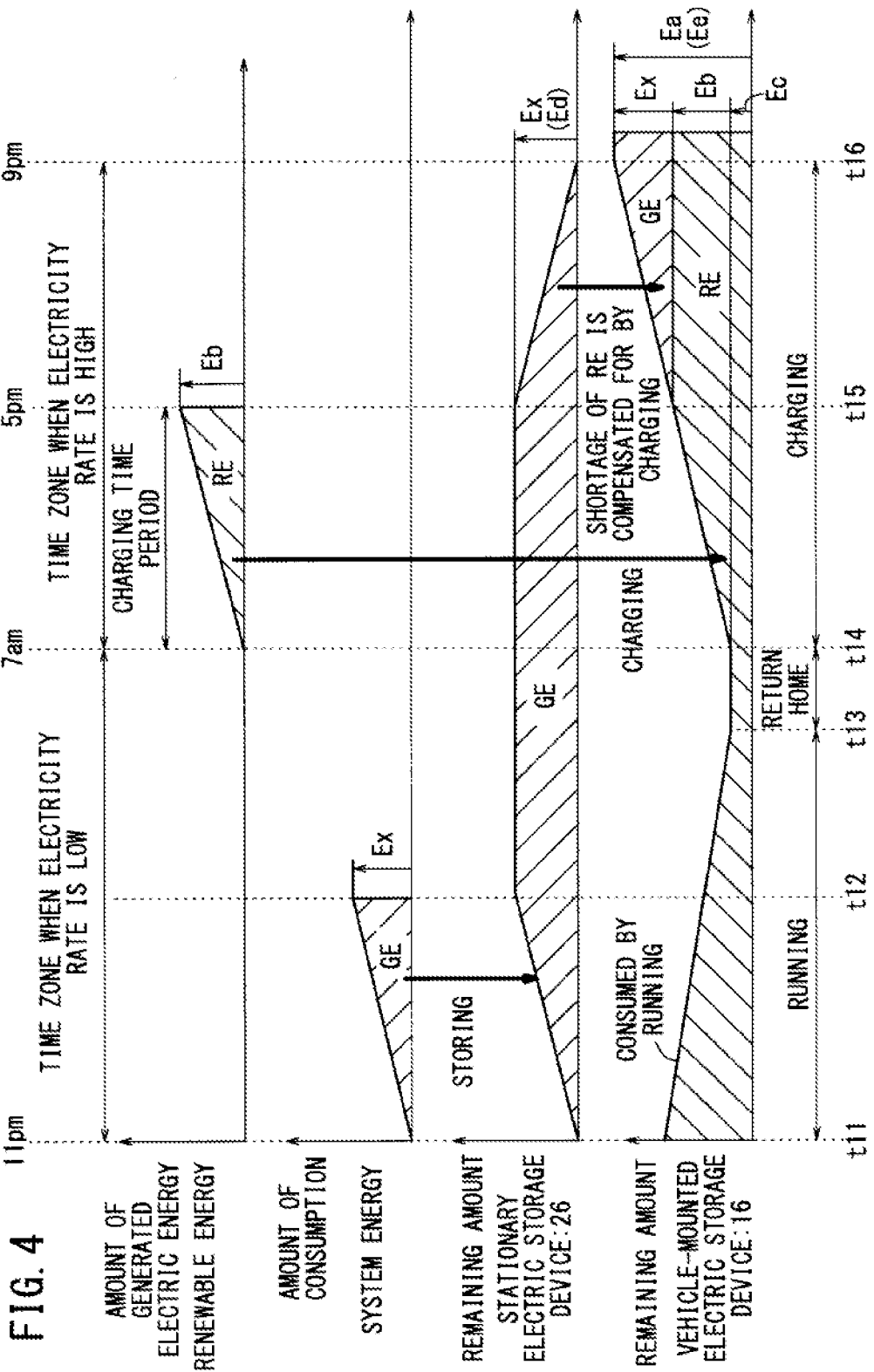
FIG. 4 is a timing chart illustrative of a case in which an electrically driven vehicle runs primarily during the nighttime, and a vehicle-mounted electric storage device is charged with a necessary amount of energy corresponding to an amount of energy consumption in a next-time running of the vehicle during the daytime.

FIG. 4 is a timing chart illustrative of a case in which the vehicle 12 runs mainly during the night, and the vehicle-mounted electric storage device 16 is charged during the daytime with the necessary amount Ee of energy corresponding to an amount of energy consumption Ea in a next-time running of the vehicle 12.

In each of FIGS. 3 and 4, the horizontal axis indicates time, while the vertical axis at the bottom of the figure indicates a remaining amount (remaining stored amount) of energy in the vehicle-mounted electric storage device 16, the vertical axis at the second from the bottom indicates a remaining amount (remaining stored amount) of energy in the stationary electric storage device 26, the vertical axis at the third from the bottom indicates an amount of energy consumption of system energy GE from the system energy source 32, and the vertical axis at the top of the figure indicates an amount of renewable energy RE generated by the solar cell panel 18.

In FIG. 3, time t1 indicates 7 in the morning (7 am), time t2 indicates 5 in the evening (5 pm), time t4 indicates 11 in the evening (11 pm), and time t6 indicates 5 in the morning (5 am).

In FIG. 4, time t11 indicates 11 in the evening (11 pm), time t14 indicates 7 in the morning (7 am), time t15 indicates 5 in the evening (5 pm), and time t16 indicates 9 in the evening (9 pm).

In FIGS. 3 and 4, each point of time is specified for illustrative purposes only.

In FIG. 3, from time t1 to time t3, since the vehicle 12 is running, the remaining amount of renewable energy RE in the vehicle-mounted electric storage device 16 decreases as energy is consumed by the running vehicle 12.

In a generation time period from time t1 to time t2 during the daytime (from 7 am to 5 pm), the amount of renewable energy FE generated by the solar cell panel 18 continuously increases up to an amount Eb at the generation end time t2. From time t1 to time t2, the generated renewable energy RE is stored in the stationary electric storage device 26, so that the remaining amount Ed of renewable energy RE in the stationary electric storage device 26 increases up to the amount Eb (Ed=Eb).

At time t3, the vehicle 12 travels back to the charging site 14 (returns home). At time t4 (11 pm), charging of the vehicle-mounted electric storage device 16 is started using a timer or the like. The vehicle-mounted electric storage device 16 is charged with the necessary amount Ee of energy corresponding to the amount of energy consumption Ea in a next-time running of the vehicle 12, from time t4 to time t6 (from 11 pm to 5 am).

In this case, the vehicle-mounted electric storage device 16 is charged with renewable energy RE including the entire remaining amount Ed (Ed=Eb) of renewable energy RE that has been stored in the stationary electric storage device 26 from time t4 to time t5. Then, from time t5 to time t6 (from midnight to 5 am), the shortage of energy is compensated for by charging with system energy GE, i.e., the necessary amount of system energy GE (necessary GE amount), during a time period in which the electricity rate of the system energy is low. That is, the amount of system energy GE used for charging the vehicle-mounted electric storage device 16 is restricted to a minimum.

Accordingly, at time t5 (5 am), when charging is ended, the vehicle-mounted electric storage device 16 is charged with the necessary amount Ee of energy corresponding to the amount of energy consumption Ea in the next-time running of the vehicle 12. The necessary amount Ee of energy that corresponds to the amount of energy consumption Ea in the next-time running of the vehicle 12 is calculated according to the following equation (1).

$$Ea\ (Ee) = \text{energy consumption in next-time running} \quad (1)$$
$$\text{(necessary amount of energy)}$$
$$= \text{necessary amount } (Ex) \text{ of system energy} +$$
$$\text{generated amount } (Eb) + \text{remaining amount } (Ec) \text{ in the}$$
$$\text{vehicle-mounted electric storage device} + \text{remaining}$$
$$\text{amount } (Ed) \text{ in the stationary electric storage device}$$

As mentioned above, an object of the present invention is to minimize or restrict to a minimum the necessary amount (Ex) of system energy used for charging the vehicle-mounted electric storage device 16.

Next, as shown in FIG. 4, from time t11 to time t13, since the vehicle 12 is running, and given the fact that the remaining amount of renewable energy RE is consumed by the running vehicle 12, the remaining amount of renewable energy RE in the vehicle-mounted electric storage device 16 decreases.

From time t11 to time t12 (from 11 pm through midnight), the required amount Ex of minimum necessary system energy GE (necessary GE amount) is stored in the stationary electric storage device 26.

At time t13, the vehicle 12 travels back to the charging site 14 (returns home). At time t14 (7 am), charging of the vehicle-mounted electric storage device 16 is started. The generated amount of electric energy by the solar cell panel 18 increases continuously from time t14 to time t15 (from 7 am to 5 pm) up to an amount Eb at the generation end time t15. The vehicle-mounted electric storage device 16 is charged directly in real time with all of the renewable energy RE that is generated from time t14 to time t15.

From time t15 to time t15, with time t16 being the charging end time (from 5 pm to 9 pm), the shortage of energy is compensated for by charging with system energy GE, which has been stored in the stationary electric storage device 26 during a time zone in which the electricity rate of system energy is low. That is, the amount of system energy GE used for charging the vehicle-mounted electric storage device 16 is restricted to a minimum.

Accordingly, at time t16 (9 pm), which is the charging end time, the vehicle-mounted electric storage device 16 is charged with the necessary amount Ee of energy corresponding to the amount of energy consumption Ea in the next-time running of the vehicle 12. The necessary amount Ee of energy, which corresponds to the amount of energy consumption Ea in the next-time running of the vehicle 12, is calculated according to the aforementioned equation (1).

[II. Calculation Process of Conditions and Parameters for Minimizing System Energy During Charging]

In order to minimize system energy during charging, it is necessary for the battery ECU 50 to obtain (e.g., by user input) or to estimate e.g., from a charging history) a charging start time, a charging end time, and a charging time period from the charging start time to the charging end time.

Figure 5:
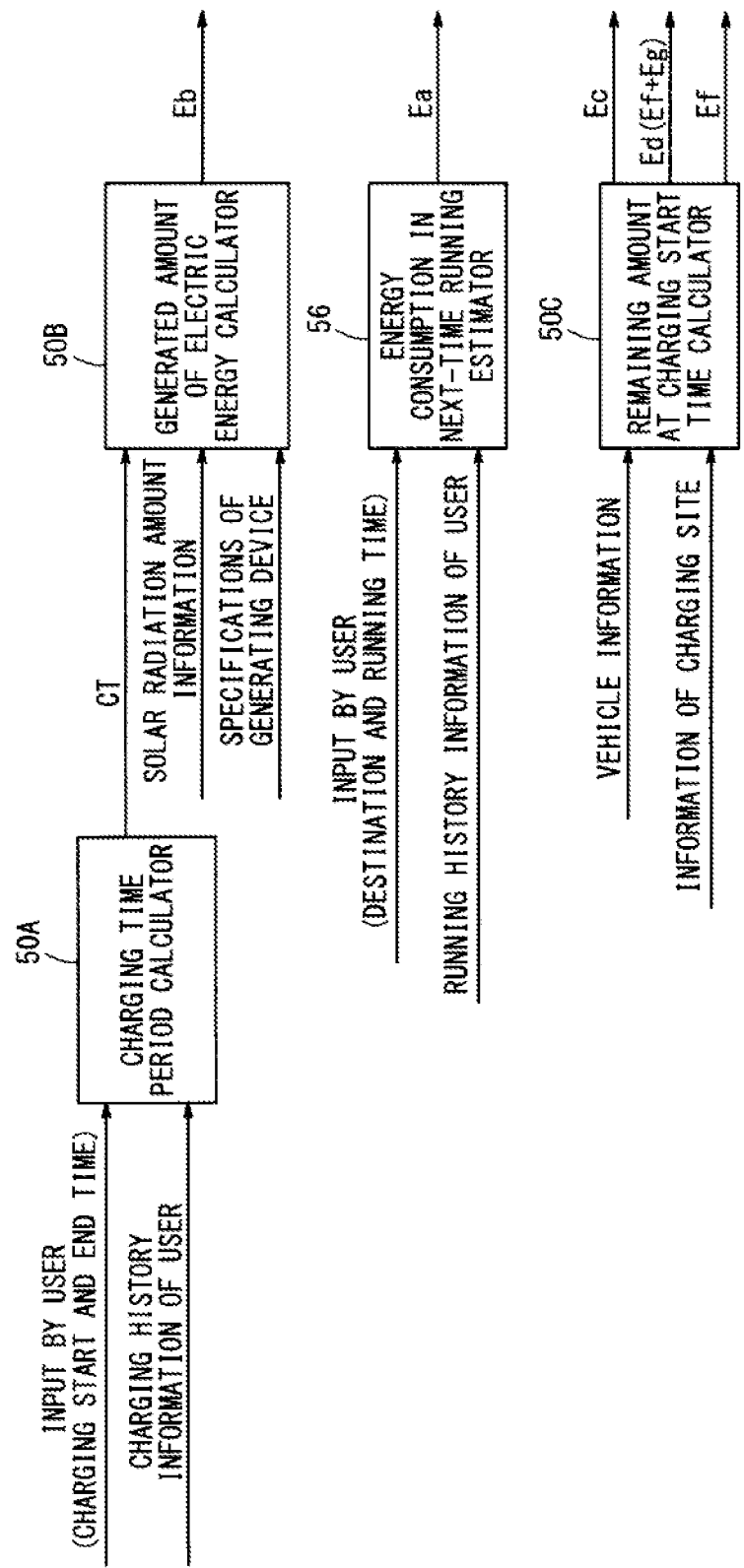
FIG. 5 is a functional block diagram for calculating or estimating various conditions and parameters.

The charging time period information needs to be obtained or estimated by the charging start time, at time t4 in FIG. 5 or at time t14 in FIG. 4.

In order to minimize system energy during charging, it is necessary, in certain cases, for the battery ECU 50 and the charging site ECU 24 to act in cooperation in order to calculate, through estimation, a generated amount Eb of electric energy by the charging end time. For example, in FIG. 4, in order to estimate a necessary amount Ex of system energy (i.e., a minimum necessary amount Ex) to be stored in the stationary electric storage device 26 from time t11 to time t12, it is necessary for the battery ECU 50 and the charging site ECU 24 to calculate, through estimation, the generated amount Eb of electric energy during a generation time period from time t11 to time t15. That is, it is necessary to calculate the amount Eb before the vehicle 12 travels back to the user's house.

Also, by the charging start time, it is necessary for the battery ECU 50 to calculate or estimate an amount of energy consumption Ea in a next-time running of the vehicle 12.

Further, it is necessary for the battery ECU 50 and the charging site ECU 24 to act in cooperation in order to calculate or estimate, at the charging start time, the remaining amount Ec in the vehicle-mounted electric storage device 16, the remaining amount Ed in the stationary electric storage device 26, and the remaining amount Ef (hereinafter also referred to as an "RE remaining amount Ef") of renewable energy contained within the remaining amount Ed in the stationary electric storage device 26. In the case that a remaining amount of system energy contained within the remaining amount Ed in the stationary electric storage device 26 is defined as a remaining amount Eg (hereinafter also referred to as a "GE remaining amount"), the remaining amount Eg is calculated by the equation Eg=Ed−Ef.

Since the aforementioned equation (1) can be transformed into the following equation (2), the necessary amount Ex of system energy can be obtained by calculating or estimating several parameters, which appear on the right side of equation (2).

$$Ex = Ea - (Eb + Ec + Eg + Ef) \quad (2)$$
$$= Ea - (Eb + Ec + Ed)$$

Ex: Necessary GE amount by present charging end time
Ea: Energy consumption in next-time running
Eb: Amount of electric energy generated by solar cell panel 18 from last charging end time to present charging end time
Ec: Remaining amount in vehicle-mounted electric storage device 16 of vehicle 12 at present charging start time
Ed: Remaining amount in stationary electric storage device 26 of charging site 14 at present charging start time
Ef: RE remaining amount contained within remaining amount Ed in stationary electric storage device 26
Eg: GE remaining amount contained within remaining amount Ed in stationary electric storage device 26

FIG. 5 is a functional block diagram of the battery ECU 50 for calculating or estimating the aforementioned conditions and parameters.

A charging time period calculator 50A calculates a charging time period CT from the charging start time and the charging end time, which are input by the user via the operating unit 52.

If no input is made by the user, the charging time period calculator 50A calculates the charging time period CT based on charging history information of the user.

A generated amount of electric energy calculator 50B calculates (estimates) the generated amount Eb of electric energy, based on the charging time period CT calculated by the charging time period calculator 50A, solar radiation amount information obtained from a solar radiation forecast according to the weather forecast on the Internet or the like, and specifications of the solar cell panel 18, which serves as a generating device concerning power generation capacity.

An energy consumption in next-time running estimator 56 calculates (estimates) the amount of energy consumption Ea in a next-time running of the vehicle 12, by referring to running distance and energy consumption specification information (or energy consumption history information) or the like based on map information, depending on a destination and a running time period, which are input by the user via an unillustrated navigation device or the like.

If no input is made by the user concerning a destination or the like, the energy consumption in next-time running estimator 56 calculates the energy consumption Ea in a next-time running of the vehicle 12, based on running history information of the user.

A remaining amount at charging start time calculator 50C calculates the remaining amount Ec in the vehicle-mounted electric storage device 16 at the charging start time, the remaining amount Ed in the stationary electric storage device 26 at the charging start time, and the RE remaining amount Ef in the stationary electric storage device 26 at the charging start time, based on intrinsic vehicle information and information concerning the charging site 14 that is obtained through the server 64. The remaining amount Ed in the stationary electric storage device 26 at the charging start time is the sum of the RE remaining amount Ef and the GE remaining amount Eg, both at the charging start time.

The remaining amount Ed and the RE remaining amount Ef in the stationary electric storage device 26 at the charging start time may be obtained by wired communications through control lines in the cables 42, 36 between the battery ECU 50 and the charging site ECU 24, at the time that the charging plug 38 of the charging site 14 is connected to the charging port 44 of the vehicle 12 for initiating charging.

[III. Storing Process in Stationary Electric Storage Device 26 and Charging Process in Vehicle-Mounted Electric Storage Device 16 for Minimizing System Energy During Charging]

Storing process of electric energy in the stationary electric storage device 26 is carried out as follows.

While the solar cell panel 18 is generating electric energy and the vehicle 12 is not being charged, renewable energy RE is stored unconditionally in the stationary electric storage device 26. While the vehicle 12 is not being charged, and if it is estimated that charging with renewable energy RE is insufficient to charge the necessary amount Ee of energy corresponding to the amount of energy consumption Ea in the next-time running of the vehicle 12, system energy GE is stored in the stationary electric storage device 26 during a time period in which the electricity rate of system energy is low.

The charging process of the vehicle-mounted electric storage device 16 is performed in the following order of priority, which has been explained above.

First priority charging mode: While the vehicle-mounted electric storage device 16 is being charged and the solar cell panel 18 is generating energy, the vehicle-mounted electric storage device 16 is charged directly in real time (not via the stationary electric storage device 26) with the generated renewable energy Re.

Second priority charging mode: While the vehicle-mounted electric storage device 16 is being charged, and if there is a remaining amount of renewable energy RE in the stationary electric storage device 26, the vehicle-mounted electric storage device 16 is charged with the remaining amount of renewable energy RE.

Third priority charging mode: While the vehicle-mounted electric storage device 16 is being charged, and if it is a time zone in which the electricity rate is low, the vehicle-mounted electric storage device 16 is charged with system energy GE from the system energy source 32 directly in real time.

Fourth priority charging mode: While the vehicle-mounted electric storage device 16 is being charged, and if there is a remaining amount of system energy GE in the stationary electric storage device 26, the vehicle-mounted electric storage device 16 is charged with the remaining amount of system energy GE. As mentioned above, the order of priority may be reversed with respect to the third priority charging mode and the fourth priority charging mode.

Fifth priority charging mode: While the vehicle-mounted electric storage device 16 is being charged, and if there is no energy in accordance with the first to fourth priority charging modes, the vehicle-mounted electric storage device 16 is charged with system energy GE from the system energy source 32 directly in real time.

[IV. Charging Method of Vehicle-Mounted Electric Storage Device 16 in Different Charging Time Periods]

Charging methods (i) to (iv) may be defined and explained as follows: (i) charging during a time zone in which the electricity rate is low; (ii) charging during a time zone in which the electricity rate is high; (iii) charging from a time zone in which the electricity rate is low to a time zone in which the electricity rate is high; and (iv) charging from a time zone in which the electricity rate is high to a time zone in which the electricity rate is low.

Figure 6:
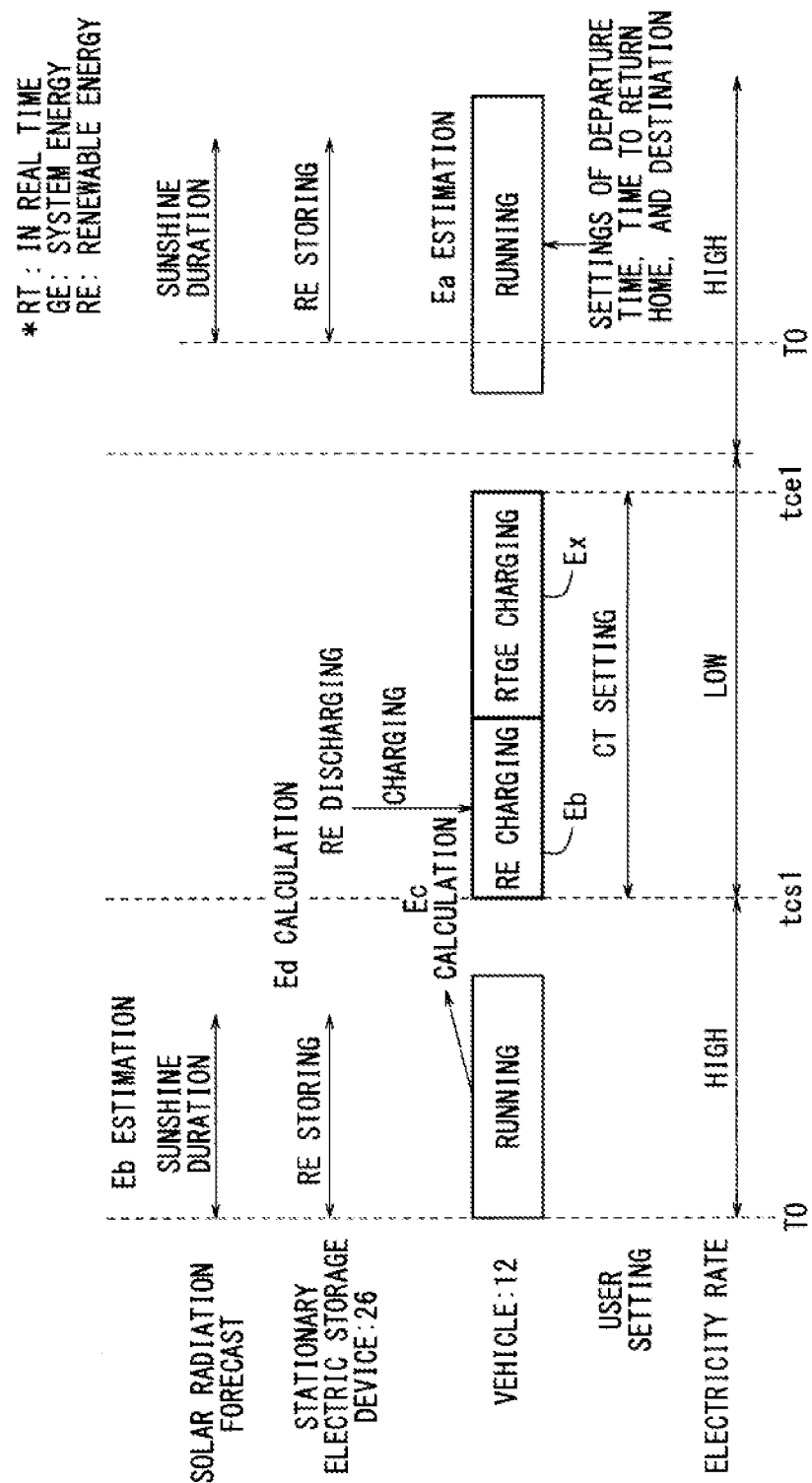
FIG. 6 is a timing chart illustrative of a method of charging during a time zone in which the electricity rate is low.

FIG. 6 is a timing chart illustrative of a charging method (i) during a time zone in which the electricity rate is low. In FIG. 6, time T0 on the left and time T0 on the right indicate, respectively, the same hour (24-hour notation) on two consecutive days.

In this case, the charging energy comprises renewable energy RE in the stationary electric storage device 26 as well as system energy GE, which is supplied in real time.

For charging the vehicle-mounted electric storage device 16 during a time zone in which the electricity rate is low, the generated energy, which is defined as renewable energy RE prior to charging, is preserved (RE storing) at a maximum level in the stationary electric storage device 26. Then, the vehicle-mounted electric storage device 16 is charged with the preserved energy (renewable energy RE) according to a given priority (RE discharging→RE charging). Any shortage of the energy is compensated for by charging with system energy GE in real time. Charging with system energy GE in real time (Real Time GE charging, RTGE charging) may be performed prior to charging with renewable energy RE.

More specifically, the charging start time tcs1 is set to the start time of a time zone in which the electricity rate is low, and the charging end time tce1 is set to a time that resides within the time zone in which the electricity rate is low.

Considering a case in which charging cannot be ended within the time zone in which the electricity rate is low, it is preferable for RTGE charging to be performed prior to RE charging.

The duration of sunshine is set based on a solar radiation forecast. Since the vehicle 12 is expected to be running during the duration of sunshine, the stationary electric storage device 26 is charged with renewable energy RE.

Before the charging start time tcs1, the user such as a driver of the vehicle 12 sets the departure time and the time to return home, for thereby setting a charging time period CT. The user also sets the destination in order to estimate the amount of energy consumption Ea in a next-time running of the vehicle 12.

As described above, from the charging start time tcs1, the vehicle-mounted electric storage device 16 is charged, for a necessary time, with renewable energy RE having the generated amount Eb from the stationary electric storage device 26. Thereafter, the vehicle-mounted electric storage device 16 is charged, for a necessary time, with system energy GE having the necessary amount Ex in real time.

Figure 7:
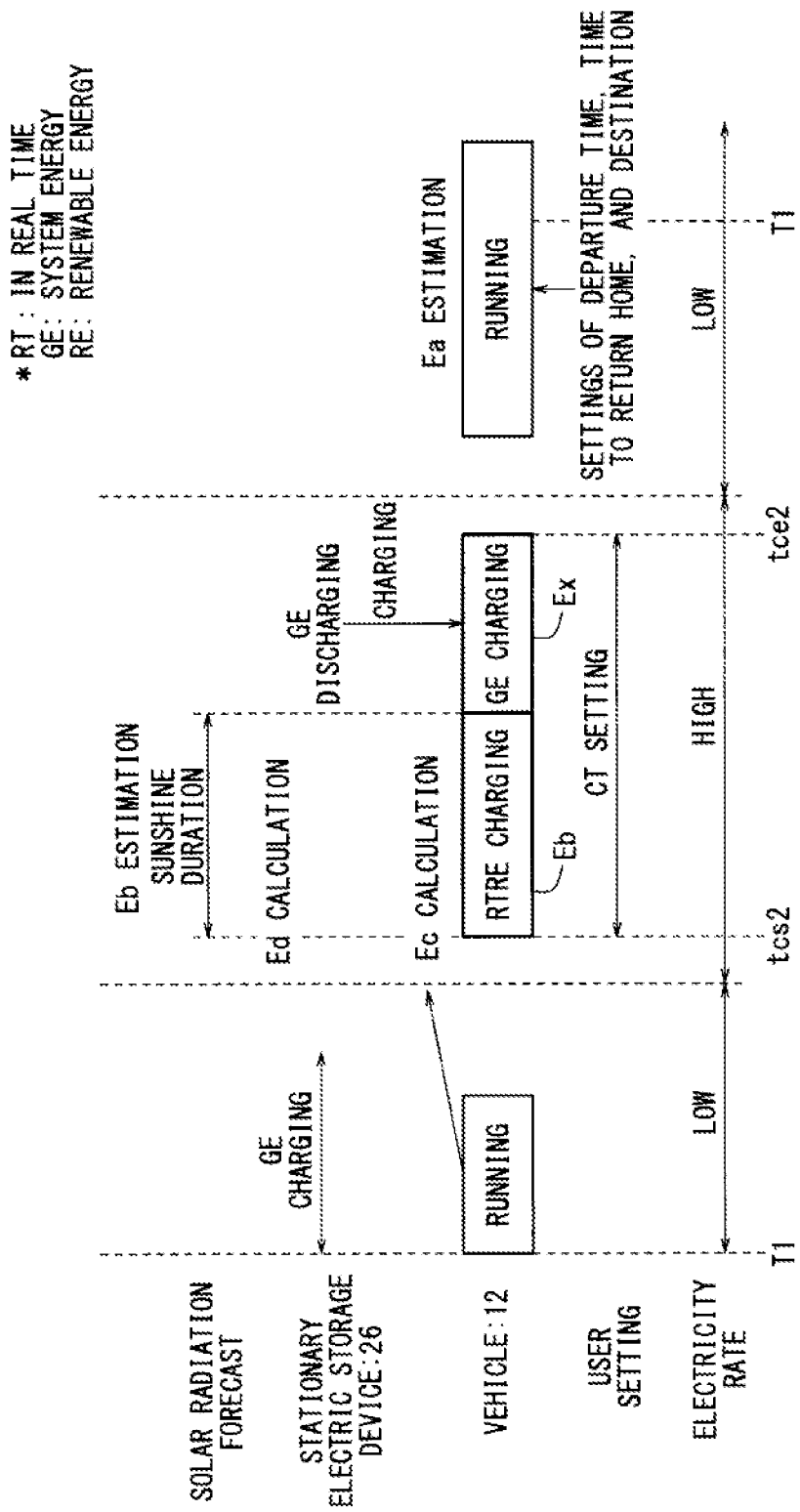
FIG. 7 is a timing chart illustrative of a method of charging during a time zone in which the electricity rate is high.

FIG. 7 is a timing chart illustrative of a charging method (ii) during a time zone in which the electricity rate is high. In FIG. 7, time T1 on the left and time T1 on the right indicate, respectively, the same hour (24-hour notation) on two consecutive days.

In this case, the charging energy comprises system energy GE (GE charging) in the stationary electric storage device 26, and renewable energy RE supplied in real time (Real Time RE charging, RTRE charging).

For charging the vehicle-mounted electric storage device 16 during a time zone in which the electricity rate is high, prior to a charging start time tcs2, an amount of energy consumption Ea in a next-time running of the vehicle 12, and remaining amounts Ec, Ed at the charging start time tcs2 are calculated. Also, a necessary amount of system energy GE is charged into the stationary electric storage device 26 during a time zone in which the electricity rate is low.

A charging start time tcs2 and a charging end time tce2 are set within a time zone at which the electricity rate is high.

From the charging start time tcs2, the vehicle-mounted electric storage device 15 is charged in real time with renewable energy RE having a generated amount Eb by the solar cell panel 18 through the distributor 20. Thereafter, the vehicle-mounted electric storage device 16 is charged for a necessary time with system energy GE having the necessary amount Ex.

Figure 8:
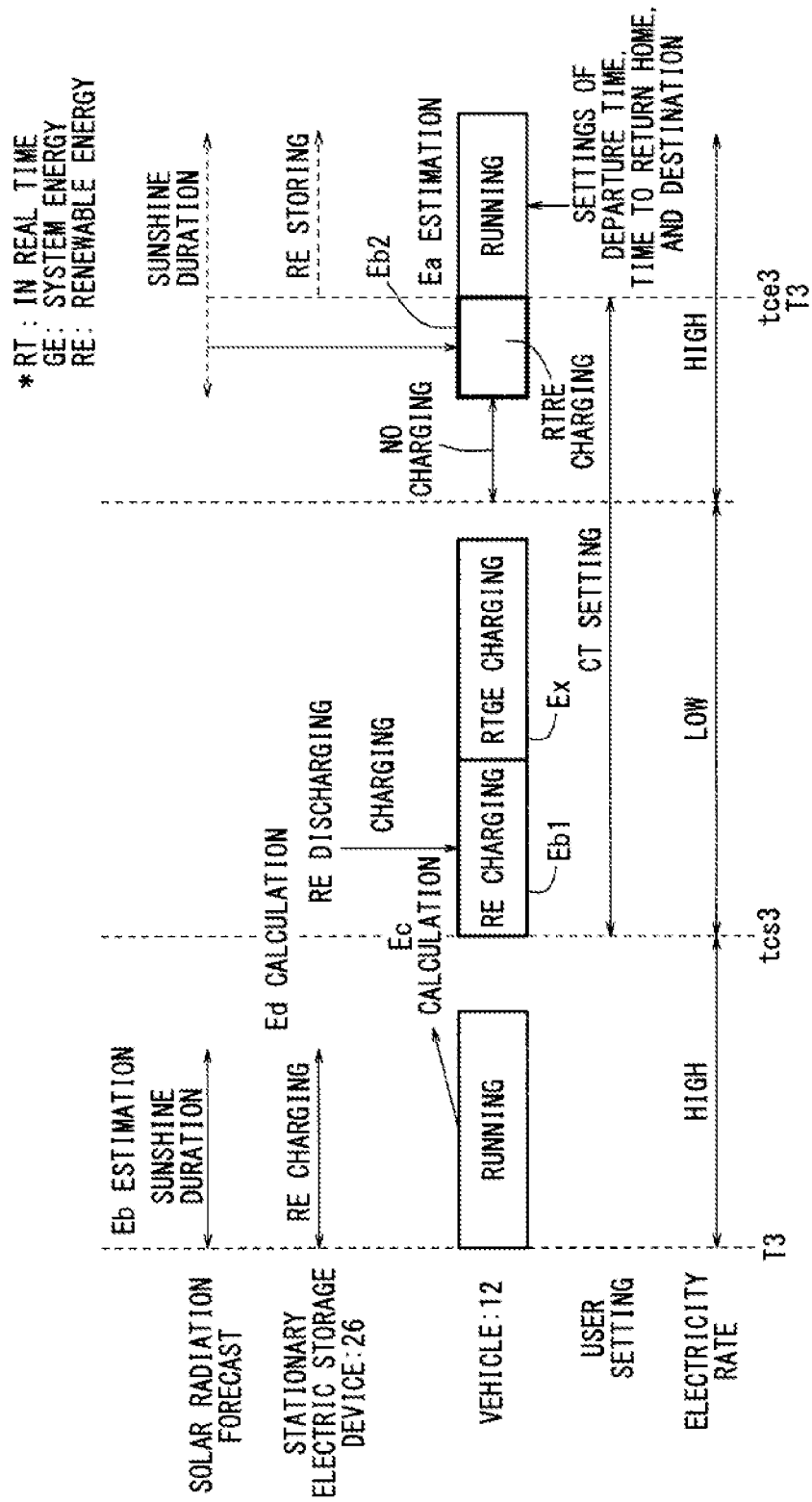
FIG. 8 is a timing chart illustrative of a method of charging from a time zone in which the electricity rate is low to a time zone in which the electricity rate is high.

FIG. 8 is a timing chart illustrative of the charging method (iii) from a time zone in which the electricity rate is low to a time zone in which the electricity rate is high. In FIG. 8, time T3 on the left and time T3 on the right indicate, respectively, the same hour (24-hour notation) on two consecutive days.

In this case, the charging energy comprises renewable energy RE in the stationary electric storage device 26 (RE charging), system energy GE supplied in real time (RTGE charging), and renewable energy RE supplied in real time (RTRE charging).

From the charging start time tcs3, the vehicle-mounted electric storage device 16 is charged with all of the renewable energy PE having a generated amount Eb1 and which is stored in the stationary electric storage device 26. If the generation of electric energy before the next-time running of the vehicle 12 and the charging end time tce3 is estimated, the vehicle-mounted electric storage device 16 will be charged in real time with renewable energy RE having a generated amount Eb2. For a shortage of energy estimated from the amount Eb2, the vehicle-mounted electric storage device 16 is charged in real time with system energy GE having the necessary amount Ex during the time zone in which the electricity rate is low.

In this case, the generated amount Eb is calculated using the equation Eb=Eb1+Eb2.

Figure 9:
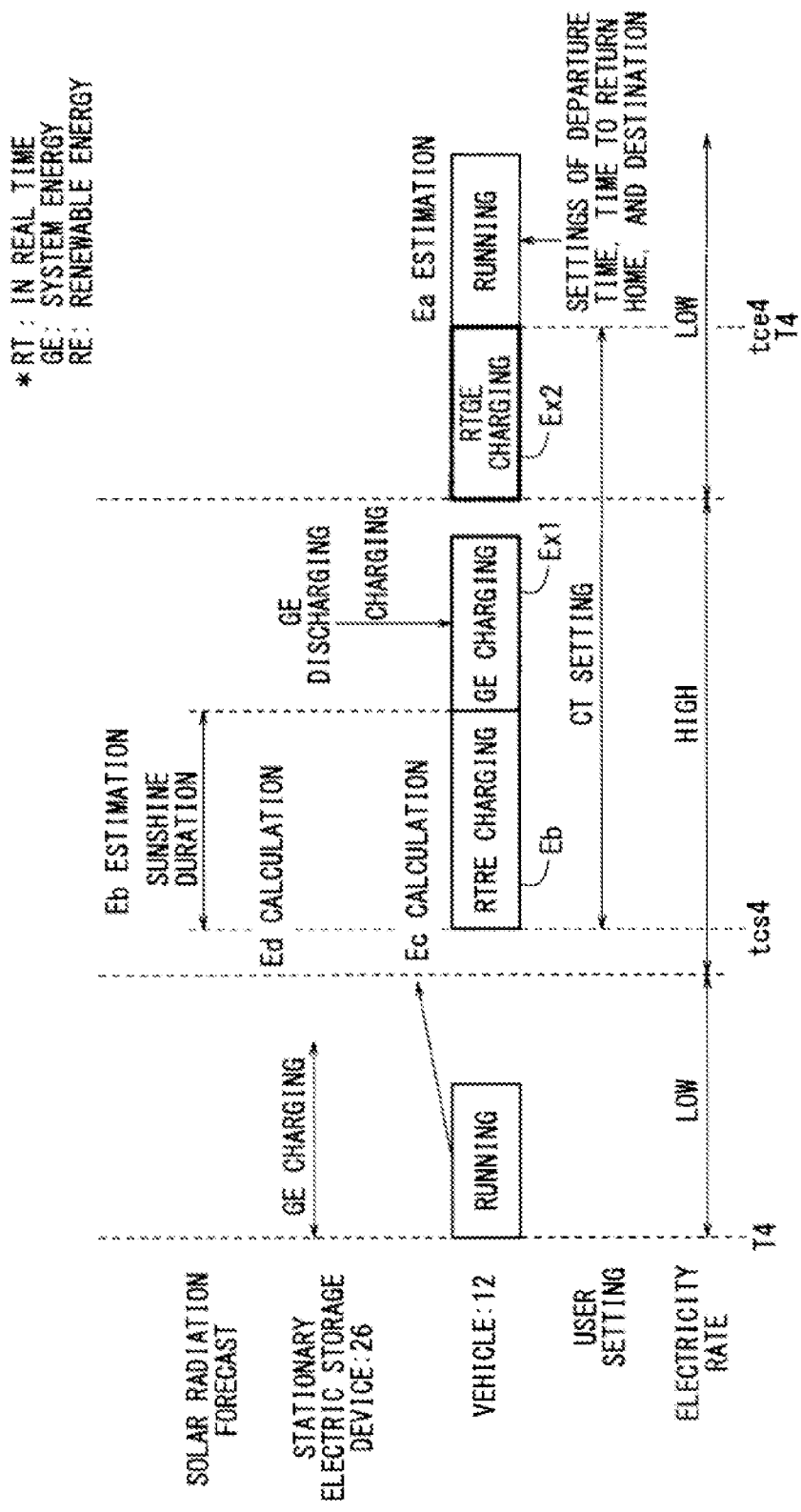
FIG. 9 is a timing chart illustrative of a method of charging from a time zone in which the electricity rate is high to a time zone in which the electricity rate is low.

FIG. 9 is a timing chart illustrative of the charging method (iv) from the time zone in which the electricity rate is high to the time zone in which the electricity rate is low. In FIG. 9, time T4 on the left and time T4 on the right indicate, respectively, the same hour (24-hour notation) on two consecutive days.

In this case, the charging energy comprises renewable energy RE that is supplied in real time (RTRE charging), system energy GE from the stationary electric storage device 26, and system energy GE that is supplied in real time (RTGE charging).

The charging start time tcs4 is set to a point in time during a time zone in which the electricity rate is low, and the charging end time tce4 is set to a point in time during a time zone in which the electricity rate is high.

For charging the vehicle-mounted electric storage device 16 during a time zone in which the electricity rate is high, prior to the charging start time tcs4, an amount of energy consumption Ea in a next-time running of the vehicle 12, and remaining amounts Ec, Ed at the charging start time tcs4 are calculated. Also, during a time zone in which the electricity rate is low, the stationary electric storage device 26 is charged with a necessary amount of system energy GE.

From the charging start time tcs4, the vehicle-mounted electric storage device 16 is charged in real time (RTRE charging) from the solar cell panel 18 and through the distributor 20 with renewable energy RE having a generated amount Eb. Thereafter, during a time zone in which the electricity rate is high, the vehicle-mounted electric storage device 16 is charged with system energy GE having a necessary amount Ex1, which is part of the necessary amount Ex, for a necessary time (GE charging). Thereafter, from the start time of a time zone in which the electricity rate is low, the vehicle-mounted electric storage device 16 is charged with system energy GE having a remaining necessary amount Ex2, which is part of the necessary amount Ex, for a certain time period just before the charging end time tce4 (RTGE charging).

In this case, the necessary amount Ex of system energy is calculated using the equation Ex=Ex1+Ex2.

[V. Timings for Performing Process of Minimizing System Energy During Charging]

Figure 10:
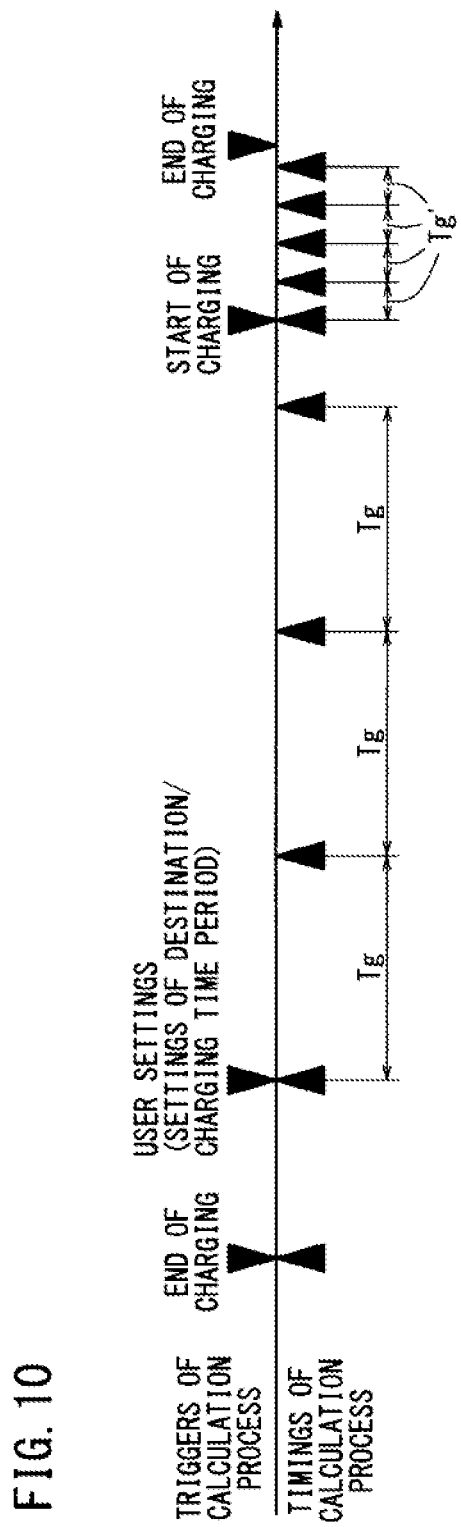
FIG. 10 is a timing chart illustrative of timings at which a charging process is performed for minimizing system energy.

FIG. 10 is a timing chart, which is illustrative of an example in which timings are shown for performing a charging process that minimizes system energy.

In FIG. 10, at each of respective timings (apexes of black upward triangles as shown in the figure) of the calculation process, all of the parameters are calculated, i.e., the generated amount EB of electric energy, the amount of energy consumption Ea in the next-time running of the vehicle 12, the remaining amount Ec of energy in the vehicle-mounted electric storage device 16, and the remaining amount Ed of energy in the stationary electric storage device 26, all of which are shown in FIG. 5.

A trigger (one of the apexes of the black downward triangles as shown in the figure) for one of the timings of the calculation process is placed at the charging end time, at which all of the above-mentioned parameters needed by the next charging start time are calculated.

Next, all of the above-mentioned parameters, which are needed by the next charging start time, are calculated, with the user's settings of the destination and the charging time period serving as another trigger. Especially, due to the effect of repeated estimation processes, the same processes are repeated for gradually improving accuracy as the next charging start time is approached.

For this purpose, even after the user's settings, all of the parameters are calculated at constant time intervals Tg, which serve as timings for the calculation process.

Further, all of the parameters are calculated using the charging start time as a trigger. Thereafter, until the charging end time, all of the parameters are calculated at constant time intervals Tg', which serve as timings for the calculation process, and which are shorter than the constant time intervals Tg.

[VI. Entire Operation Based on Flowcharts]

A program pursuant to the flowcharts shown in FIGS. 11, 12, 13A through 13D, 14, and 15 can be executed by any of the charging site ECU 24, the server 64, and the battery ECU 50, since these components share necessary information synchronously through the communication links 66, 68 and the server 64. In the present embodiment, the charging site ECU 24 executes all of the processes.

Figure 11:
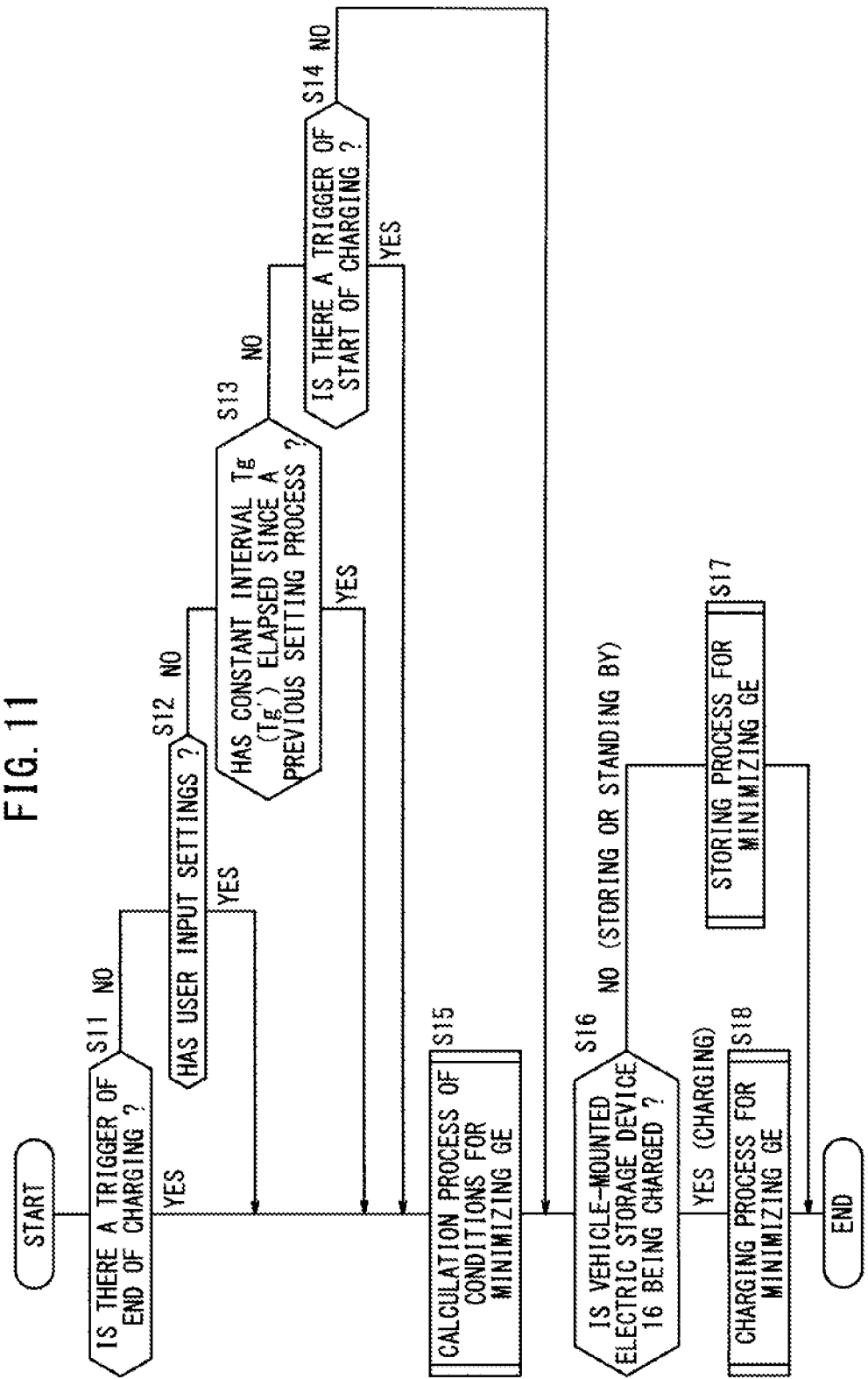
FIG. 11 is a main flowchart of a charging control for minimizing system energy.

FIG. 11 is a main flowchart of a charging control for minimizing system energy.

In step S11, it is judged whether or not there is a trigger indicative of the end of charging of the vehicle-mounted electric storage device 16, with the amount of energy consumption Ea in a next-time running at the present time (see FIG. 10). If there is no trigger indicative of the end of charging, in step S12, it is judged whether or not the user has input settings. If the user has not input settings, then in step S13, it is judged whether the constant interval Tg has elapsed since a previous setting process if charging is not performed, or whether the constant interval Tg' has elapsed since the previous setting process if charging is performed. If such constant intervals have not elapsed, then in step S14, it is judged whether there is a trigger indicative of the start of charging.

If it is judged as affirmative (YES) in any of steps S11 through S14, a process of calculating conditions for minimizing system energy (GE) is performed.

Figure 12:
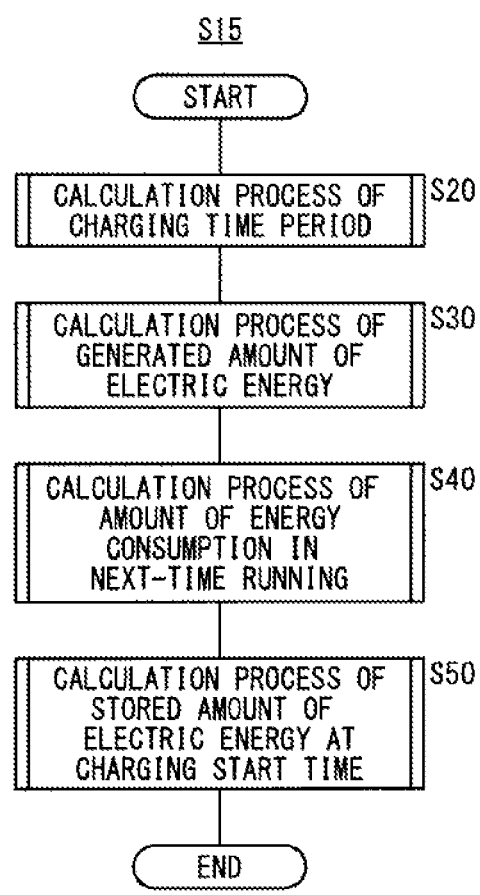
FIG. 12 is a detailed flowchart of a calculation process of conditions required for minimizing system energy.

FIG. 12 is a detailed flowchart of a calculation process of the conditions for minimizing GE in step S15.

In step S20, a calculation process for calculating a charging time period is performed. In step S30, a calculation process for calculating a generated amount of electric energy is performed. In step S40, a calculation process for calculating energy consumption in a next-time running of the vehicle 12 is performed. In step S50, a calculation process for calculating a stored amount of electric energy in the stationary electric storage device 26 at the charging start time is performed.

Figure 13A:
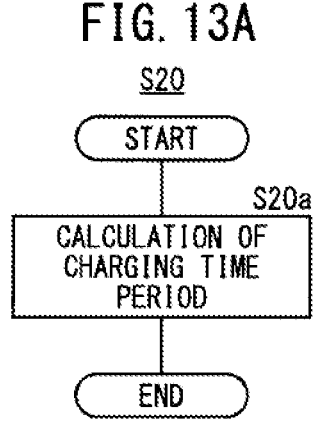
FIG. 13A is a flowchart of a calculation process of a charging time period.

In step S20, as shown in FIG. 13A, a calculation process for calculating the charging time period is performed in step S20*a*, based on the user's settings or a charging history.

Figure 13B:
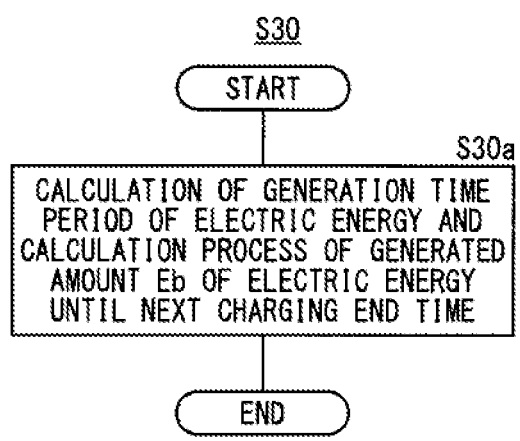
FIG. 13B is a flowchart of a calculation process of a generated amount of electric energy.

In step S30, as shown in FIG. 13B, a calculation process for calculating the generation time period of the electric energy, and a calculation process for calculating a generated amount Eb of electric energy until the next charging end time are performed in step S30*a*.

Figure 13C:
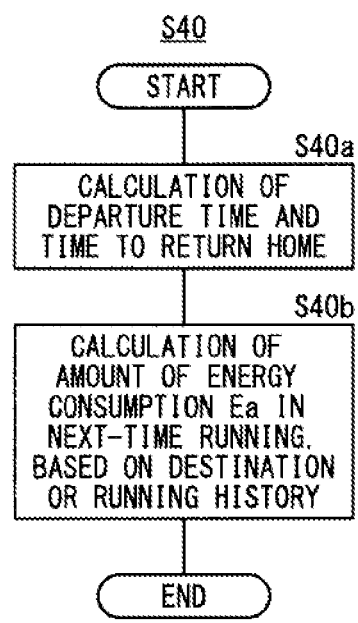
FIG. 13C is a flowchart of a calculation process of an amount of energy consumption in a next-time running of the vehicle.

In step S40, as shown in FIG. 13C, a calculation process for calculating a departure time and a time to return home is performed in step S40*a*, and a calculation process for calculating an amount of energy consumption Ea in a next-time running of the vehicle 12 is performed based on the destination or a running history in step S40*b*.

Figure 13D:
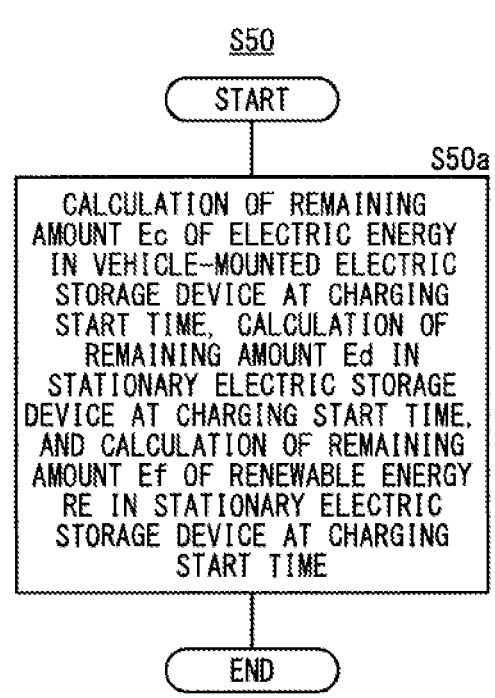
FIG. 13D is a flowchart of a calculation process of a remaining amount of electric energy at a charging start time.

In step S50, as shown in FIG. 13D, a calculation process for calculating a remaining amount Ec of electric energy in the vehicle-mounted electric storage device 16 at the charging start time, a calculation process for calculating a remaining amount Ed in the stationary electric storage device 26 at the charging start time, and a calculation process for calculating a remaining amount Ef of renewable energy RE in the stationary electric storage device 26 at the charging start time, are performed in step S50*a*.

In FIG. 11, after the process in step S15 is performed, or if it is judged in step S14 that charging has not yet started, in step S16, it is judged whether or not the vehicle-mounted electric storage device 16 is being charged. Charging is started either by a timer setting or by a manual operation.

If the vehicle-mounted electric storage device 16 is in a standby condition, or if electric energy is being stored, which implies that the vehicle-mounted electric storage device 16 is not being charged, in step S17, a process of minimizing system energy during storage is performed on the stationary electric storage device 26 (storage process for minimizing GE). If the vehicle-mounted electric storage device 16 is being charged, in step S18, a process of minimizing system energy during charging is performed on the vehicle-mounted electric storage device 16 (charging process for minimizing GE).

Figure 14:
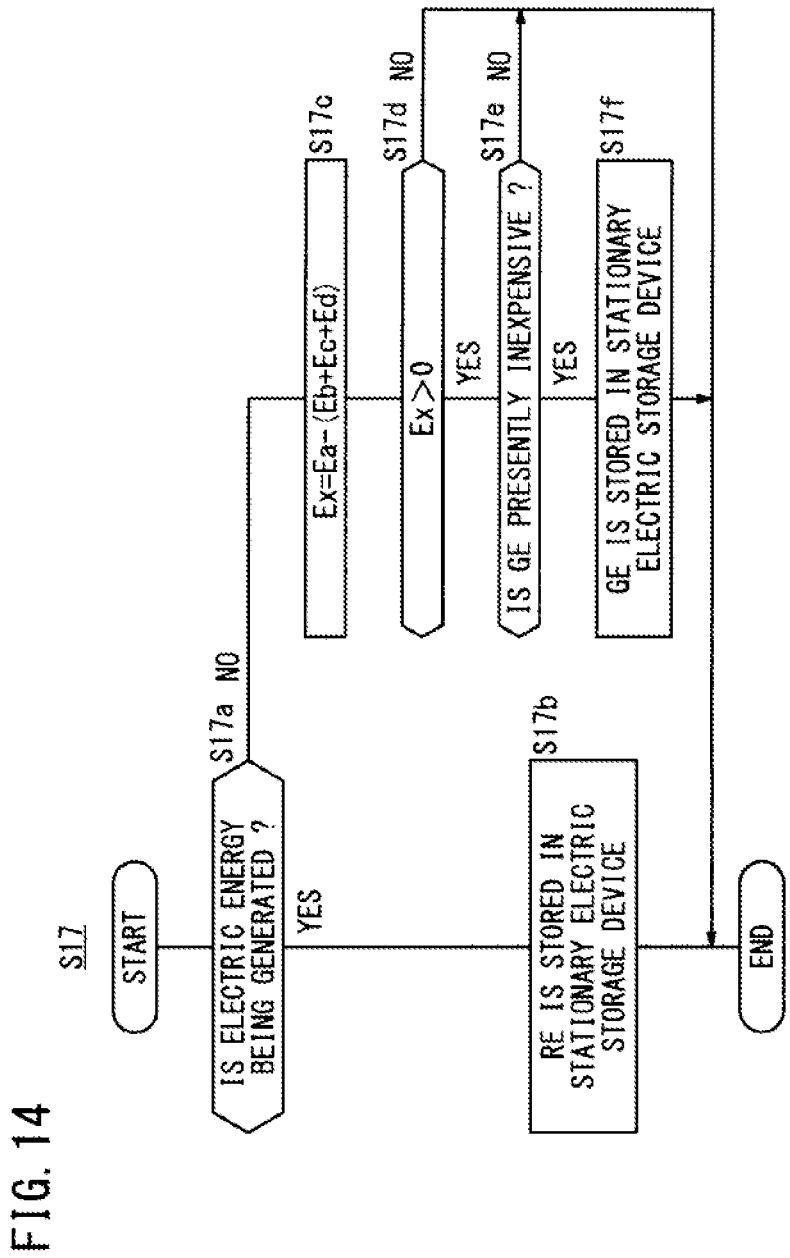
FIG. 14 is a detailed flowchart of a storage process for minimizing system energy.

FIG. 14 is a detailed flowchart of the storage process for minimizing GE carried out in step S17.

In step S17*a*, it is judged whether or not electric energy is being generated. If energy is being generated, in step S17*b*, the generated renewable energy RE is stored in the stationary electric storage device 26. If energy is not being generated, then in step S17*c*, a necessary amount Ex of system energy is calculated according to the above-mentioned equation (2).

In step S17*d*, it is judged whether or not the necessary amount Ex is a positive value. If the necessary amount Ex is a positive value, then in step S17*e*, it is judged whether or not it is a time zone in which the electricity rate of system energy GE is low (whether GE is presently inexpensive). If it is a time zone in which the electricity rate is low, then in step S17*f*, system energy GE is stored in the stationary electric storage device 26.

After step S17*b* or step S17*f*, or if the judgment in step S17*d* or step S17*e* is negative, the processing sequence returns to the main flow chart shown in FIG. 11.

Figure 15:
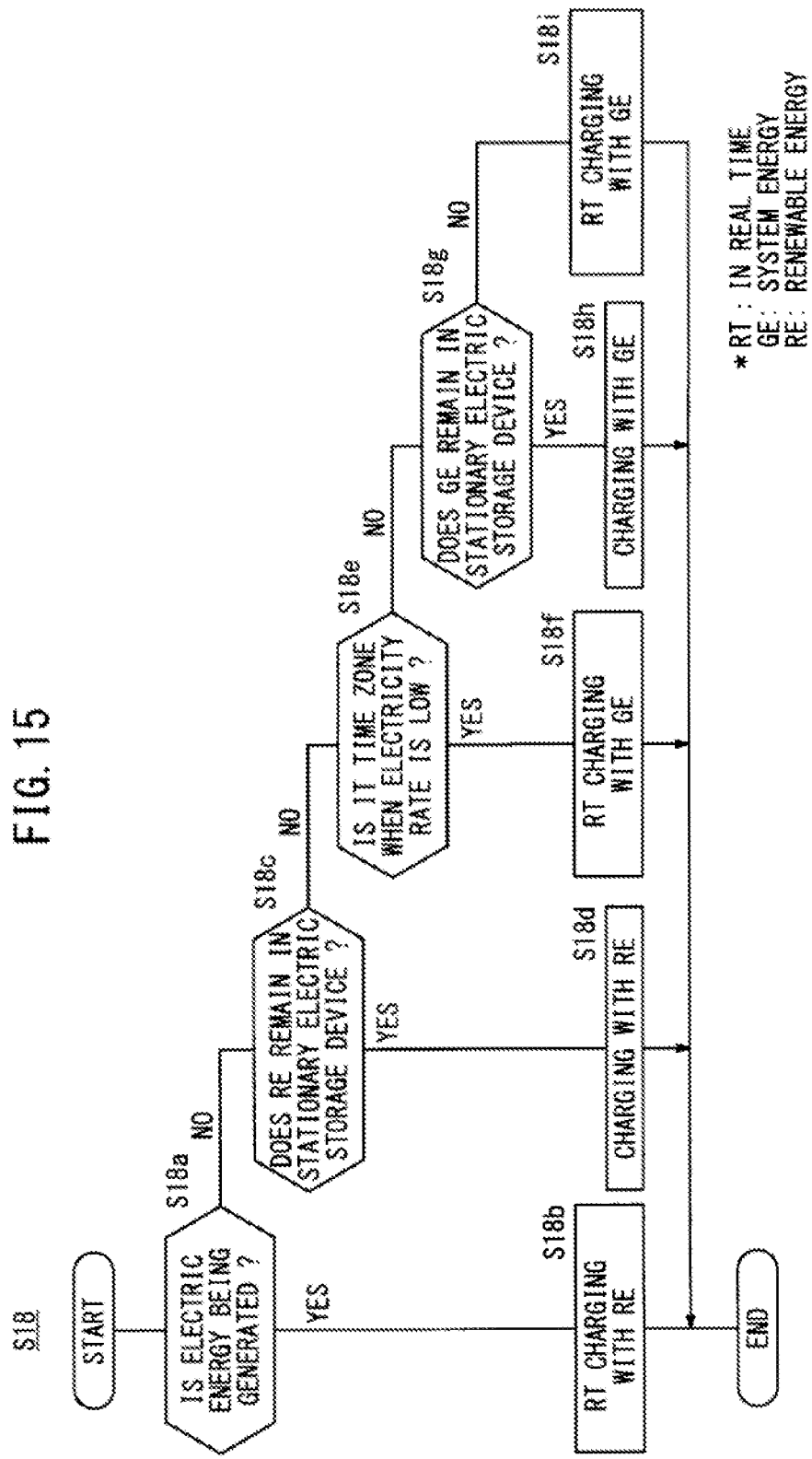
FIG. 15 is a detailed flowchart of a charging process for minimizing system energy.

FIG. 15 is a detailed flowchart of the charging process for minimizing GE carried out in step S18.

In step S18*a*, it is judged whether or not electric energy is being generated by the solar cell panel 18. If energy is being generated, then in step S18*b*, the vehicle-mounted electric storage device 16 is charged in real time with the generated renewable energy RE.

If the solar cell panel 18 is not generating electric energy, in step S18*c*, it is judged whether or not renewable energy RE remains in the stationary electric storage device 26. If renewable energy RE remains in the stationary electric storage device 26, then in step S18*d*, the vehicle-mounted electric storage device 16 is charged with the remaining renewable energy RE.

If renewable energy RE does not remain in the stationary electric storage device 26, then in step S18*e*, it is judged whether or not it is a time zone in which the electricity rate is low. If it is a time zone in which the electricity rate is low, in step S18*f*, the vehicle-mounted electric storage device 16 is charged in real time with system energy GE having a low electricity rate.

If it is not a time zone in which the electricity rate is low, then in step S18*g*, it is judged whether or not system energy GE remains in the stationary electric storage device 26. If system energy GE remains in the stationary electric storage device 26, in step S18*h*, the vehicle-mounted electric storage device 16 is charged with the remaining system energy GE.

If it is judged in step S18*g* that system energy GE does not remain in the stationary electric storage device 26, then in step S18*i*, the vehicle-mounted electric storage device 16 is charged with system energy GE in real time.

Figure 16:
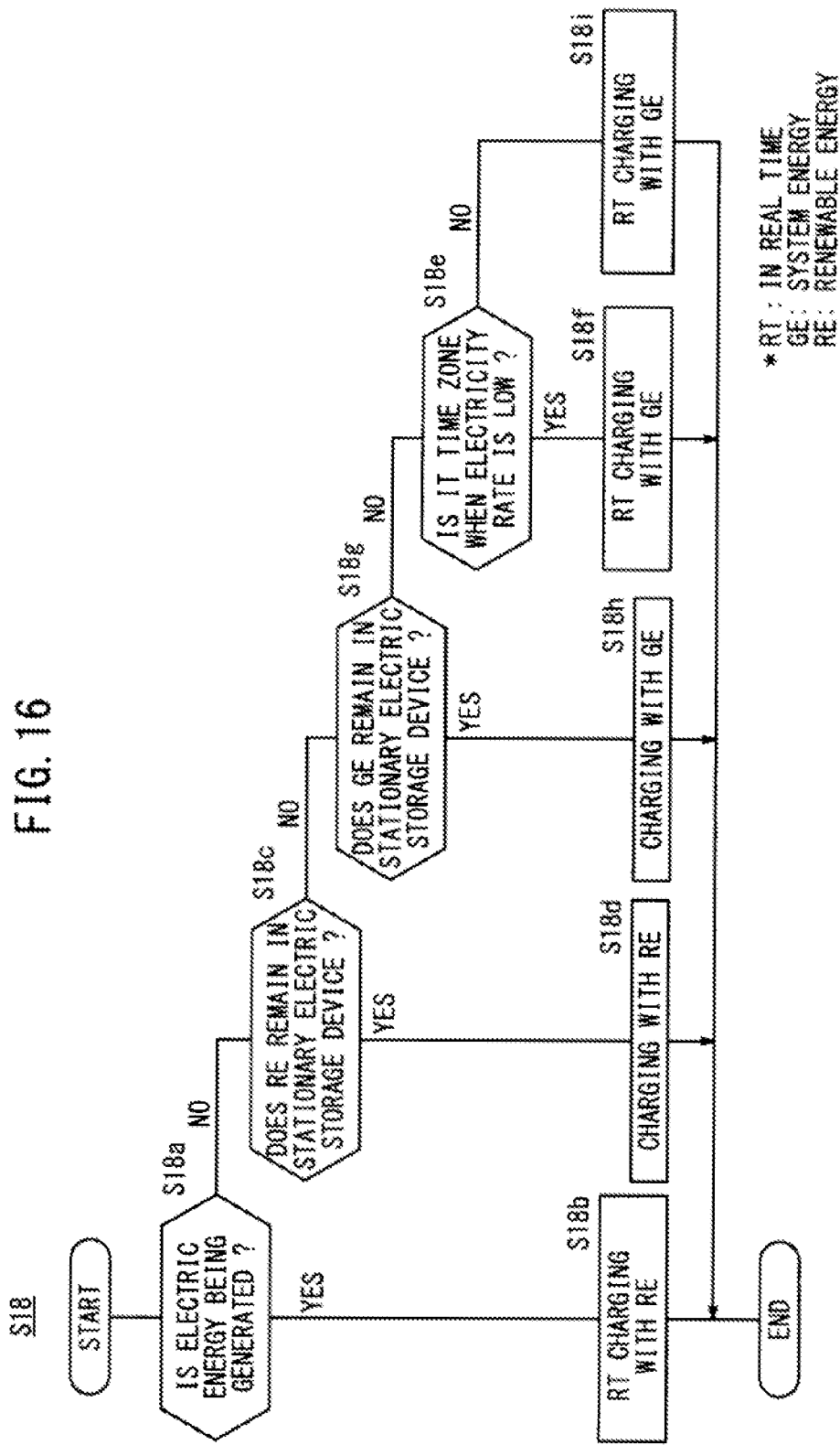
FIG. 16 is a detailed flowchart of a charging process for minimizing system energy according to a modified embodiment.

Alternatively, as shown in FIG. 16, which is a flowchart of a modified embodiment, the processes of steps S18*e* and S18*f* in FIG. 15 may be performed after steps S18*g* and S18*h*.

SUMMARY OF EMBODIMENTS

The charging system 10 for minimizing system energy according to the embodiment of the present invention comprises the electrically driven vehicle 12 and the charging site 14. The electrically driven vehicle 12 includes the vehicle-mounted electric storage device 16, which is charged with and retains renewable energy RE and system energy GE, and the battery ECU 50, which functions as a vehicle-mounted charging controller for controlling charging of the vehicle-mounted electric storage device 16. The charging site 14 includes the solar cell panel 18, which serves as a generating device for generating renewable energy RE, the stationary electric storage device 26, which serves as a charging site electric storage device for storing renewable energy RE and system energy GE, and the charging site ECU 24, which serves as a charging-site charging controller for controlling storage of energy in the stationary electric storage device 26 as well as controlling the type of energy used for charging the vehicle-mounted electric storage device 16 of the electrically driven vehicle 12.

In this structure, when the battery ECU 50 and the charging site ECU 24 act in cooperation to charge the vehicle-mounted electric storage device 16 of the electrically driven vehicle 12 with the necessary amount Ee of energy, which corresponds to the amount of energy consumption Ea in a next-time running of the electrically driven vehicle 12, the shortage of renewable energy RE from the charging site 14 is compensated for by charging with system energy GE from the charging site 14. Therefore, it is possible to minimize the necessary amount EX of system energy used for charging the vehicle-mounted electric storage device 16.

More specifically, using the equation $Ex=Ea-(Eb+Ec+Ed)$, the battery ECU 50 and the charging site ECU 24 calculate the necessary amount EX of system energy to be used in charging the vehicle-mounted electric storage device 16 of the electrically driven vehicle 12 by the present charging end time, where Ea is the energy consumption in a next-time running of the vehicle 12, Eb is the amount of electric energy generated by the solar cell panel 18 from the last charging end time to the present charging end time, Ec is the remaining amount of electrical energy in the vehicle-mounted electric storage device 16 of the electrically driven vehicle 12 at the present charging start time, and Ed is the remaining amount of electrical energy in the stationary electric storage device 26 at the charging site 14 at the present charging start time, thereby minimizing the necessary amount EX of system energy used for charging.

The battery ECU 50 and the charging site ECU 24 memorize (store) the electricity rate of the system energy GE within each time zone. When the vehicle-mounted electric storage device 16 of the electrically driven vehicle 12 is charged from the charging site 14, the vehicle-mounted electric storage device 16 is charged with system energy GE in real time during a time zone in which the electricity rate is the lowest. Thus, the cost of system energy GE used for charging the vehicle-mounted electric storage device 16 can be reduced.

When the vehicle-mounted electric storage device 16 of the electrically driven vehicle 12 is charged from the charging site 14, the battery ECU 50 and the charging site ECU 24 charge the vehicle-mounted electric storage device 16 with renewable energy RE in real time generated by the solar well panel 18, assuming that the solar cell panel 18 is generating the renewable energy RE. Thus, the amount of renewable energy RE used for charging the vehicle-mounted electric storage device 16 can be maximized.

The battery ECU 50, the charging site ECU 24, and the server 64 are capable of estimating the amount of energy consumption Ea in a next-time running of the vehicle 12, based on a past energy consumption history during running of the vehicle 12.

The present invention is not limited to the foregoing embodiments. In the embodiments, for example, electric energy is charged and discharged through contacts that are provided by the charging plug 38 and the charging port 44, which are connected through the cable 36. However, electric energy may be charged and discharged through a contactless structure, such as a transformer having primary and secondary coils.

Although preferred embodiments of the present invention have been described above, many changes and modifications may be made to the embodiments based on the disclosure of the present invention, without departing from the scope of the invention as set forth in the appended claims.

What is claimed is:

1. A charging system for minimizing system energy comprising:
    an electrically driven vehicle including a vehicle-mounted electric storage device, which is charged with and retains renewable energy and system energy, and a vehicle-mounted charging controller for controlling charging of the vehicle-mounted electric storage device; and
    a charging site including a generating device for generating the renewable energy, a charging site electric storage device for storing the renewable energy and the system energy, and a charging-site charging controller for controlling storage of energy in the charging site electric storage device, and also controlling a type of energy used for charging the vehicle-mounted electric storage device of the electrically driven vehicle from the charging site,
    wherein the charging-site charging controller maintains information on a remaining amount of the renewable energy and a remaining amount of the system energy in the charging site electric storage device after the renewable energy and the system energy were previously stored in the charging site electric storage device,
    wherein the vehicle-mounted charging controller and the charging-site charging controller cooperate to charge the vehicle-mounted electric storage device of the electrically driven vehicle with a necessary amount of energy, such that a shortage of the renewable energy is compensated for by charging with the system energy, and
    wherein the vehicle-mounted charging controller and the charging-site charging controller memorize an electricity rate of the system energy in respective time zones, and charge the vehicle-mounted electric storage device in a priority order of: i) with the renewable energy in real time ii) with one of the renewable energy stored in the charging site electric storage device and the system energy in real time during a low-rate time zone in which an electricity rate of system energy is lower than a threshold; iii) with the other of the stored renewable energy and the real-time system energy during the low-rate time zone; iv) with the system energy stored in the charging site electric storage device; and v) with the system energy in real time during a high-rate time zone in which an electricity rate of system energy is higher than the threshold.

2. The charging system for minimizing system energy according to claim 1, wherein when the vehicle-mounted charging controller and the charging-site charging controller charge the vehicle-mounted electric storage device only during the low-rate time zone, the vehicle-mounted electric storage device is charged in a priority order of: with the real-time system energy during the low-rate time zone; and with the stored renewable energy.

3. The charging system for minimizing system energy according to claim 1, wherein when the vehicle-mounted charging controller and the charging-site charging controller charge the vehicle-mounted electric storage device from the low-rate time zone to the high-rate time zone, the vehicle-mounted electric storage device is charged in a priority order of: with the stored renewable energy during the low-rate time zone; with the real-time system energy during the low-rate time zone; and with the real-time renewable energy during the high-rate time zone.

4. The charging system for minimizing system energy according to claim 1, wherein when the vehicle-mounted charging controller and the charging-site charging controller charge the vehicle-mounted electric storage device from the high-rate time zone to the low-rate time zone, the vehicle-mounted electric storage device is charged in a priority order of: with the real-time renewable energy during the high-rate time zone; with the stored system energy during the high-rate time zone; and with the real-time system energy during the low-rate time zone.

* * * * *